(12) United States Patent
Kjell et al.

(10) Patent No.: US 8,220,831 B2
(45) Date of Patent: *Jul. 17, 2012

(54) SIDE CURTAIN AIR-BAG

(75) Inventors: Fredrik Kjell, Alingsas (SE); Mats Berntsson, Gothenburg (SE); Per Hellberg, Boras (SE); Marcus Lövqvist, Gothenburg (SE)

(73) Assignee: Autoliv Development AB, Vargarda (SE)

( * ) Notice: Subject to any disclaimer, the term of this patent is extended or adjusted under 35 U.S.C. 154(b) by 319 days.

This patent is subject to a terminal disclaimer.

(21) Appl. No.: 12/409,864

(22) Filed: Mar. 24, 2009

(65) Prior Publication Data

US 2009/0184497 A1 Jul. 23, 2009

Related U.S. Application Data

(63) Continuation of application No. 10/577,810, filed as application No. PCT/EP2004/012155 on Oct. 27, 2004, now Pat. No. 7,527,287.

(30) Foreign Application Priority Data

Oct. 31, 2003 (GB) .................................. 0325540.3

(51) Int. Cl.
  *B60R 21/213* (2011.01)
  *B60R 21/232* (2011.01)
(52) U.S. Cl. ................ 280/730.2; 280/728.2; 280/743.1
(58) Field of Classification Search ............... 280/728.2, 280/730.2, 743.1
  See application file for complete search history.

(56) References Cited

U.S. PATENT DOCUMENTS

| | | | |
|---|---|---|---|
| 6,129,377 A | 10/2000 | Okumura et al. | |
| 6,234,517 B1 | 5/2001 | Miyahara et al. | |
| 6,237,943 B1 | 5/2001 | Brown et al. | |
| 6,338,498 B1 | 1/2002 | Niederman et al. | |
| 6,481,744 B2 | 11/2002 | Melia | |
| 6,530,594 B1 | 3/2003 | Nakajima et al. | |
| 6,568,706 B2 | 5/2003 | Mueller | |
| 6,626,456 B2 | 9/2003 | Terbu et al. | |
| 6,761,374 B2 | 7/2004 | Di Sante et al. | |
| 6,808,199 B2 | 10/2004 | Saderholm et al. | |
| 6,851,702 B2 | 2/2005 | Henderson et al. | |
| 7,040,647 B2 | 5/2006 | Deligny et al. | |
| 7,303,206 B2 | 12/2007 | Kippschull et al. | |
| 2002/0153713 A1 | 10/2002 | Fischer | |
| 2003/0042712 A1 | 3/2003 | Henderson et al. | |
| 2003/0116947 A1 | 6/2003 | Yokoyama et al. | |
| 2003/0188979 A1 | 10/2003 | Saderholm et al. | |
| 2004/0108693 A1 | 6/2004 | Foster et al. | |
| 2006/0237950 A1 | 10/2006 | Worrell et al. | |
| 2007/0296189 A1 | 12/2007 | Berntsson et al. | |

FOREIGN PATENT DOCUMENTS

| | | |
|---|---|---|
| GB | 2 394 921 A | 5/2004 |
| JP | 09-207701 | 8/1997 |
| JP | 2001-039257 | 2/2001 |
| JP | 2001-328503 | 11/2001 |
| JP | 2002-316611 | 10/2002 |
| JP | 2003-200180 | 7/2003 |
| JP | 2003-252161 | 9/2003 |
| WO | WO 02/085674 A2 | 10/2002 |

*Primary Examiner* — Paul N Dickson
*Assistant Examiner* — George Spisich
(74) *Attorney, Agent, or Firm* — Brinks Hofer Gilson & Lione

(57) ABSTRACT

In at least one embodiment of the present invention, an inflatable curtain for a motor vehicle is provided. The inflatable curtain is formed of layers of fabric and is deployable from a rolled state forming a roll to an inflated state. The air-bag comprises part of the air-bag that forms the upper-most edge of the air-bag when the air-bag is in the inflated state extending downwardly from the roll to lie proximate a side part of the motor vehicle on which the air-bag is to be mounted. At least a portion of the roll is positioned above the upper-most edge in the rolled state and is driven downward below the upper-most edge during deployment to the inflated state. The air-bag further provides a gas flow duct. When the air-bag is in the rolled state, the gas flow duct is provided at the top part of the roll.

4 Claims, 1 Drawing Sheet

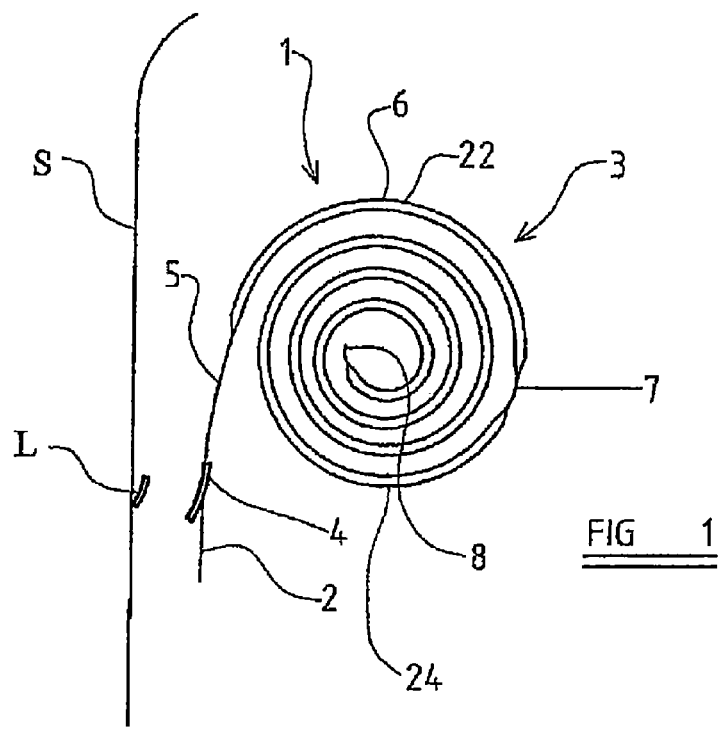
FIG 1
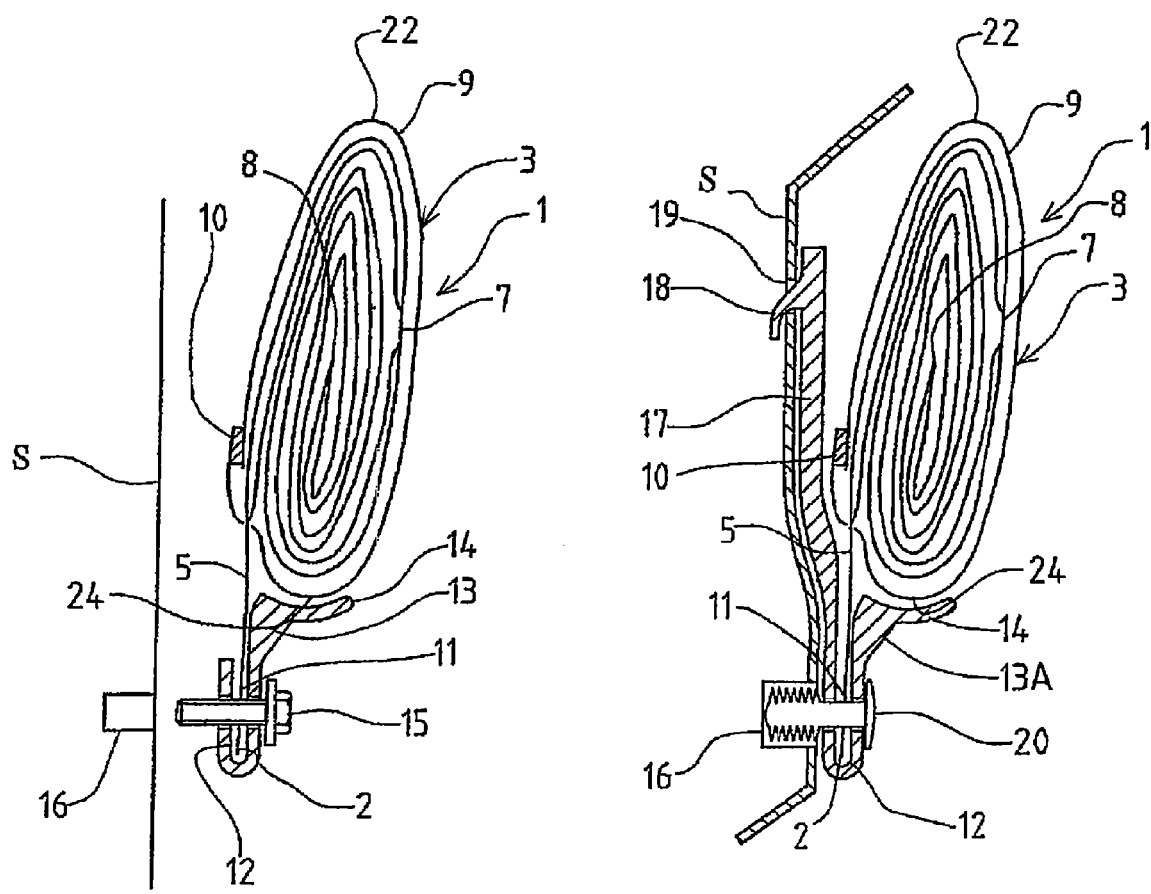
FIG 2
FIG 3

SIDE CURTAIN AIR-BAG

CROSS REFERENCE TO RELATED APPLICATIONS

This application claims priority to and is a continuation application of U.S. patent application Ser. No. 10/577,810, filed Apr. 28, 2006, now U.S. Pat. No. 7,527,287, entitled "SIDE CURTAIN AIR-BAG", which is hereby incorporated herein by reference. U.S. patent application Ser. No. 10/577,810 claims priority to and all benefits of Great Britain patent application number 0325540.3, filed Oct. 31, 2003 and PCT/EP2004/012155, filed Oct. 27, 2004.

FIELD OF THE INVENTION

The present invention relates to an air-bag arrangement, and more particularly relates to an air-bag arrangement in the form of an inflatable curtain.

BACKGROUND OF THE INVENTION

It is known to provide an air-bag in the form of a so-called "inflatable curtain". An air-bag of this type is usually mounted in the roof of a motor vehicle and, on inflation, is intended to lie adjacent the side windows of the vehicle, thus constituting a "side curtain" in order to provide protection for the head of an occupant of the vehicle. A side curtain of this type may be of substantial advantage for a vehicle occupant in the event of a side impact or roll-over situation.

Many proposals have been made in connection with such inflatable curtains.

WO 02/085674 A2 shows an inflatable curtain and shows a specific method for folding the curtain. The curtain is folded by using a rolling technique which rolls the curtain about an axis which, when mounted in the vehicle, is substantially horizontal, a terminal part of the curtain then being folded to extend generally upwardly above the roll. The folded curtain is mounted in position by using this upwardly directed portion. On deployment of the air-bag, the air-bag effectively unrolls to lie adjacent a side window of the vehicle.

The disadvantage with the arrangement of WO 02/085674 A2 is that it involves a rolling technique and also a folding technique, meaning that assembly apparatus must be provided to effect the rolling operation and separate apparatus must be provided to effect the folding operation.

SUMMARY OF THE INVENTION

The present invention seeks to provide an improved air-bag arrangement. According to the present invention, there is provided an air-bag arrangement, in the form of an inflatable curtain, the inflatable curtain being rolled to form a roll, part of the inflatable curtain that is to form the upper-most edge of the inflatable curtain when inflated extending downwardly from the roll to lie adjacent a side part of a motor vehicle on which the inflatable curtain is to be mounted.

Preferably, the part of the inflatable curtain extending downwardly from the roll is a substantially uninflatable region provided with one or more mounting formations. Advantageously, the mounting formations comprise a plurality of mounting tabs to be connected to mounting lugs. Conveniently, the mounting formations comprise a plurality of mounting apertures to engage bolts, "Christmas tree" snap connectors or the like. Preferably, the air-bag is associated with a mounting bracket. Advantageously, the mounting bracket incorporates an open topped channel dimensioned to receive part of the downwardly-extending part of the air-bag. Conveniently, the side-walls of the channel are provided with co-aligned apertures to be co-aligned with the mounting apertures formed in the air-bag, to enable mounting elements in the form of bolts, "Christmas tree" snap connectors or the like to pass through the co-aligned apertures to mount the bracket and thus the inflatable curtain to a motor vehicle. Preferably, the bracket incorporates a plurality of hooks. Advantageously, the hooks are provided at a position above the open-topped channel to engage apertures provided in a side-wall of a motor vehicle. Conveniently, the bracket includes a supporting platform to support the rolled air-bag. Preferably, the rolled air-bag is contained within a protective cover. Advantageously, the protective cover comprises a sleeve provided with a breakable seam.

Conveniently, the air-bag is rolled towards the outboard side of the air-bag.

Preferably, the air-bag incorporates a gas flow duct, the gas flow duct, when the air-bag is rolled, being provided at the top part of the roll.

Advantageously, the one or more mounting formation is located at a position which is not above the upper-most part of the air-bag roll, and may be located completely below the roll.

DESCRIPTION OF THE DRAWINGS

In order that the invention may already be understood, and so that further features thereof may be appreciated, embodiments of the invention will now be described, by way of example, with reference to the accompanying drawings in which:

FIG. 1 is a diagrammatic sectional view of part of an air-bag arrangement in accordance with the invention, FIG. 2 is a view corresponding to FIG. 1 showing a modified embodiment of the invention, and FIG. 3 is a view corresponding to FIGS. 1 and 2 showing a further modified embodiment of the invention.

DETAILED DESCRIPTION OF THE INVENTION

Here it is to be understood that a typical inflatable curtain, as in general use, is provided, adjacent its upper-most edge, with a plurality of mounting lugs or equivalent fixing devices to secure the upper edge of the inflatable curtain to the part of the roof of a motor vehicle which extends above the side door openings and/or side windows of the vehicle. The inflatable curtain may extend the whole length of the vehicle cabin or only part of the length of the vehicle cabin.

Typically, adjacent the upper edge of the inflatable curtain, a gas flow duct is provided which extends across the whole length of the inflatable curtain. Below the gas flow duct are a plurality of inflatable cells or chambers, and some of the inflatable cells or chambers may be separated by uninflatable regions.

There are many different detailed designs of inflatable curtain, and the present invention is not related to any specific design.

FIG. 1 illustrates an air-bag 1 in the form of an inflatable curtain 1 which is shown in a rolled condition. The edge 2 of the inflatable curtain air-bag 1 which forms the upper-most or top edge when the inflatable curtain is inflated is shown emerging from a generally spiral-wound roll 3, with the edge 2 being directed so as to extend downwardly. Adjacent the edge 2 the air-bag 1 is provided with a mounting formation in the form of a tab 4. The rolled air-bag 1 is shown immediately adjacent part S of the side of a motor vehicle, and a mounting lug L is shown provided on the side part S of the motor vehicle for co-operation with the mounting tab 4 to secure the air-bag 1 to the vehicle.

The part of the side curtain air-bag 1 extending upwardly from the edge 2 and adjacent the mounting tab 4 forms an uninflatable region 5. Immediately adjacent the uninflatable region 5 is a region of the inflatable curtain that forms a transversely extending gas flow duct 6. The gas flow duct 6 is defined between two sheets of fabric that have been connected together to form the inflatable curtain. In an alternative embodiment, the gas flow duct may be a separate tube, which is separate from the main part of the inflatable curtain. The tube may be of plastic, textile or metal. The sheets of fabric may be sewn together but typically are formed simultaneously using a one-piece weaving process which is known per se. The two sheets of fabric are shown woven together to form a seam 7 that defines the lower-most edge of the gas flow duct 6. It is to be observed that the gas flow duct 6 extends across the top most part of the roll 3. The roll 3 continues concentrically inwards, the lower-most or bottom edge 8 of the inflatable curtain being located at the centre of the roll. It is to be understood that the region between the seam 7 and the lower-most edge 8 is provided with the above-mentioned cells or chambers. The cells or chambers, when inflated, constitute a passenger protecting area.

Here it is to be understood that the roll 3, in this embodiment, has been formed by rolling the lower-most edge of the inflatable curtain towards the side of the inflatable curtain air-bag 1 which, when the inflatable curtain is inflated, constitutes the "outboard" side of the inflatable curtain. The rolling may be accomplished using any convenient form of rolling apparatus.

It is to be appreciated that the inflatable curtain air-bag 1 of FIG. 1 will be contained within an appropriate package, such as a fabric sleeve or a housing surrounding the roll 3, but the package is not shown at this stage for the sake of clarity.

In the event that the inflatable curtain air-bag 1 is to be inflated, in an accident situation, gas is initially supplied to the gas flow duct 6 from a gas generator (not shown). The gas flow duct 6 thus becomes inflated, at least along part of the length of the gas flow duct. Since the gas flow duct extends across the top of the roll 3, inflation of the gas flow duct will tend to drive the rest of the roll 3 downwardly. Consequently a downward motion is imparted to the main part of the inflatable curtain air-bag 1. This facilitates the ready inflation of the air-bag 1 so that it occupies a fully deployed state within a very few milliseconds of deployment being instigated.

As the inflatable curtain air-bag 1 becomes deployed, so the roll 3 will unroll. Because the roll has been rolled "towards" the outboard sides of the inflatable curtain, the inflatable curtain air-bag 1 will unroll in such a way that the main body of the roll tends to be driven towards the adjacent window or side part S of the vehicle. The inflating side curtain air-bag 1 will therefore tend to position itself between the head of a seat occupant within the vehicle and the adjacent side of the vehicle, even if the head of the occupant is resting lightly against the window or sides of the vehicle, for example, if the seat occupant is sleeping. It is to be understood that it would be possible, if the air-bag 1 unrolled in the opposite sense, for the air-bag to ride over the head of a vehicle occupant if the head of the occupant were lying adjacent the window, with the head of the occupant thus becoming trapped between the air-bag and the window. This is clearly undesirable.

FIG. 1 illustrates a very simple embodiment of the invention. FIG. 2 illustrates a rather more detailed embodiment of the invention. In this embodiment, the roll 3 described above has been compressed so as to have an oval or more rectangular cross-sectional shape, so that the roll 3 is less obtrusive in the roof-lining of the vehicle. The roll has been surrounded by a textile cover 9 in the form of a sleeve, which has a breakable tape seam 10. The tape seam 10 is intended to rupture on instigation of deployment of the air-bag. Alternatively the textile cover could have a tear line, such as a perforation, or some other line of mechanical weakness.

In this embodiment of the invention the uninflatable region 5 adjacent the upper-most edge 2 of the inflatable curtain air-bag 1 is provided with a mounting aperture 11, and the free edge 2 is received within a channel or slot 12 formed in a mounting bracket 13. The slot 12 is an upwardly open channel. The mounting bracket 13 incorporates a supporting platform portion 14 which extends beneath the roll 3 to support the roll, and a mounting bolt 15 is provided which extends through co-aligned apertures formed in opposite sides of the channel 12 and which also passes through the mounting aperture 11 formed in the uninflatable region 5 of the inflatable curtain. The bolt 15 may be received within an appropriate mount 16 which may be threaded in the side part S of the vehicle, to secure the air-bag 1 to the motor vehicle.

It is therefore to be noted that in both the embodiment of FIG. 1 and the embodiment of FIG. 2 the air-bag 1 is mounted in position within the vehicle by co-operating mounting formations which are located separately beneath the main body of the roll 3.

FIG. 3 illustrates an embodiment which is similar to that of FIG. 2, save that the mounting bracket 13A comprises an additional upwardly extending finger or flange 17 which extends upwardly from the channel 12 to a position slightly above the mid-point of the roll 3 on the outboard side of the roll 3. The finger 17 terminates with a downwardly-turned hook 18 shown engaged with an aperture 19 formed in the side part S of the vehicle. In the embodiment of FIG. 3 the bolt 15 has been replaced by a "Christmas tree"-type snap connector 20.

It is to be appreciated that in mounting the embodiment of FIG. 3 in position in a motor vehicle, initially the hook 18 will be engaged with the aperture 19 and subsequently the Christmas tree fastener 20 will be engaged with the co-operating mounting 16 formed in the side part S of the vehicle.

Of course, in each embodiment described above, a plurality of mounting configurations will be provided spaced along the length of the inflatable curtain air-bag 1. Thus in the embodiment of FIG. 1 there will be a plurality of attachment tabs 4 and co-operating attachment lugs L, e.g., second mounting lug L and second mounting tab 14 indicated by dashed lines (schematic and for illustrative purposes only). In the embodiment of FIG. 2 there will be a plurality of bolts 15 and in the embodiment of FIG. 3 there will be a plurality of Christmas tree snap connectors 20 and a plurality of hooks 18.

In each of the described embodiments, the roll 3 is mounted in position in the motor vehicle by means of one or more mounting arrangements, the mounting arrangements all being located at a level which is not above the top-most part 22 of the roll 3. In the preferred embodiments, the mounting arrangements include at least one mounting arrangement located beneath the lower-most part 24 of the roll 3.

In the described preferred embodiments of the invention the roll 3 is located above the mounting arrangement. This has the advantage that there is usually more space available in an upper portion of the roof frame, rather than the lower portion, and thus at least most of the packaged inflatable curtain air-bag 1 is located in part of the roof where there is ample space to accommodate it.

It is to be understood that the invention provides the advantage that the inflatable curtain air-bag 1 can be simply rolled and packaged, and there is therefore no requirement for a folding apparatus to be provided in addition to the rolling apparatus to facilitate packaging of the inflatable curtain.

While the above description constitutes the preferred embodiment of the present invention, it will be appreciated that the invention is susceptible to modification, variation, and change without departing from the proper scope and fair meaning of the accompanying claims.

The invention claimed is:

1. An inflatable curtain for a motor vehicle formed of layers of fabric and being deployable from a rolled state forming a roll to an inflated state, the air-bag comprising part of the air-bag that forms the upper-most edge of the air-bag when the air-bag is in the inflated state extending downwardly from the roll to lie proximate a side part of the motor vehicle on which the air-bag is to be mounted, wherein at least a portion of the roll is positioned above the upper-most edge in the rolled state and is driven downward below the upper-most edge during deployment to the inflated state, wherein the air-bag further provides a gas flow duct, and when the air-bag is in the rolled state the gas flow duct extends along a top-most part of the roll such that during deployment the gas flow duct initially inflates driving a remaining portion of the roll downward to facilitate deployment to the inflated state, wherein the air-bag is rolled to form the rolled state in a direction towards the outboard side of the air-bag, wherein in the rolled state the upper-most edge extends downwardly from the roll without having a fold formed therebetween, and at least an upper half portion of the roll is positioned above the upper-most edge.

2. An air-bag according to claim 1 wherein the upper-most edge that is downwardly extending is a substantially uninflatable region of the air-bag provided with one or more mounting formations.

3. An air-bag according to claim 1 wherein the air-bag further comprises a mounting bracket.

4. An air-bag according to claim 1 wherein the air-bag in the rolled state is contained within a protective cover.

* * * * *